(12) United States Patent
Karem et al.

(10) Patent No.: US 12,686,492 B2
(45) Date of Patent: Jul. 21, 2026

(54) AIRCRAFT WITH TRANSONIC ROTOR

(71) Applicant: Karem Aircraft, Inc., Lake Forest, CA (US)

(72) Inventors: Abraham Karem, Lake Forest, CA (US); John Paul Parcell, Lake Forest, CA (US); Sage Thayer, Lake Forest, CA (US); Ryan Patterson, Lake Forest, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 0 days.

(21) Appl. No.: 18/654,639

(22) Filed: May 3, 2024

(65) Prior Publication Data

US 2025/0340290 A1 Nov. 6, 2025

(51) Int. Cl.
*B64C 11/18* (2006.01)
*B64C 29/00* (2006.01)
*B64C 30/00* (2006.01)

(52) U.S. Cl.
CPC .......... *B64C 29/0033* (2013.01); *B64C 11/18* (2013.01); *B64C 30/00* (2013.01)

(58) Field of Classification Search
CPC ....... B64C 11/00; B64C 11/003; B64C 11/16; B64C 11/18; B64C 11/20; B64C 11/205; B64C 11/22; B64C 11/24; B64C 11/26; B64C 11/28; B64C 11/46; B64C 11/48; B64C 11/50; B64C 27/023; B64C 27/46; B64C 27/463; B64C 27/467; B64C 27/473; B64C 27/48; B64C 27/50; B64C 29/0008; B64C 29/0016; B64C 29/0025; B64C 29/0033; B64C 30/00; B64C 2027/4733; B64C 2027/4736; B64C 2230/28

USPC .......................................................... 244/7 A
See application file for complete search history.

(56) References Cited

U.S. PATENT DOCUMENTS 3,065,933 A * 11/1962 Williams .............. B64C 27/467
                                                    244/17.11
3,467,197 A * 9/1969 Drees .................... B64C 27/463
                                                    416/228
4,370,097 A * 1/1983 Hanson ................... B64C 11/16
                                                    416/223 R (Continued)

FOREIGN PATENT DOCUMENTS

EP            1961658 A1 * 8/2008 ........... B64C 27/473
WO     WO-2010124015 A1 * 10/2010 ............. B64C 27/28
WO     WO-2015163855 A1 * 10/2015 ............. B64C 11/18

OTHER PUBLICATIONS

James Sutherland, "Development and Whirl Flutter Testing of Swept-Tip Tiltrotor Blades", University Libraries DRUM Digital Repository at the University of Maryland, dated 2022, 2 pages.

(Continued)

*Primary Examiner* — Joshua E Rodden
(74) *Attorney, Agent, or Firm* — Fish IP Law, LLP; Tomas A. Prieto

(57) ABSTRACT

A rotorcraft aircraft design incorporates double swept forward and aft rotor blades configured to provide efficient hover and efficient cruise at Mach number of 0.65-0.7 without varying a diameter of the rotor. The aircraft design combines the benefits of helicopters and fixed-wing aircraft, enabling vertical takeoff and landing (VTOL) capabilities while also achieving improved forward flight speed and reduced noise emissions.

13 Claims, 6 Drawing Sheets

(56) References Cited

U.S. PATENT DOCUMENTS

| | | | | |
|---|---|---|---|---|
| 4,687,416 | A * | 8/1987 | Spranger | B64C 11/16 |
| | | | | 416/200 R |
| 5,584,661 | A * | 12/1996 | Brooks | B64C 27/467 |
| | | | | 416/238 |
| 6,116,857 | A * | 9/2000 | Splettstoesser | B64C 27/467 |
| | | | | 416/228 |
| 6,641,365 | B2 | 11/2003 | Karem | |
| 7,331,765 | B2 * | 2/2008 | Falchero | B64C 27/467 |
| | | | | 416/228 |
| 8,096,779 | B2 * | 1/2012 | Rochegude | B64C 27/473 |
| | | | | 416/226 |
| 8,128,376 | B2 | 3/2012 | Karem | |
| 10,220,943 | B2 * | 3/2019 | Leusink | B64C 27/467 |
| 10,415,581 | B1 | 9/2019 | Seeley | |
| 10,899,440 | B2 * | 1/2021 | Sargent | B64C 27/463 |
| 11,608,743 | B1 * | 3/2023 | Tweedt | B64C 11/18 |
| 12,116,119 | B2 * | 10/2024 | Min | B64C 27/467 |
| 2005/0158175 | A1 | 7/2005 | Falchero | |
| 2010/0272576 | A1 | 10/2010 | Karem | |
| 2011/0024552 | A1 * | 2/2011 | Patt | B64C 29/0033 |
| | | | | 244/6 |
| 2011/0036955 | A1 | 2/2011 | Karem | |
| 2011/0236208 | A1 * | 9/2011 | Hirsch | B64C 27/463 |
| | | | | 416/23 |
| 2014/0061392 | A1 * | 3/2014 | Karem | B64C 11/26 |
| | | | | 244/7 R |
| 2017/0174339 | A1 * | 6/2017 | Leusink | B64C 27/463 |
| 2019/0248472 | A1 * | 8/2019 | Zipszer | B64C 27/473 |
| 2023/0029889 | A1 * | 2/2023 | Reichert | B64C 11/14 |

OTHER PUBLICATIONS

C. W. Acree Jr. et al., "Improving Tiltrotor Whirl-Mode Stability with Rotor Design Variations", ntrs.nasa.gov, dated 2000, 3 pages.
Seyhan Gul et al., "Aeroelastic Loads and Stability of Swept-Tip Hingeless Tiltrotors towards High-Speed Instability-Free Cruise", Journal of the American Helicoptor Society, dated 2023, 18 pages, vol. 68.
James Sutherland et al., "Final Report, Swept Tip Blades for Mach-Scaled High Speed Tiltrotor Tests", Defense Technical Information Center, dated Sep. 30, 2019, 12 pages.
International Search Report and Written Opinion for International Patent Application No. PCT/US2024/027449, dated Sep. 5, 2024, 13 pages.
B. Benoit, et al., "Aerodynamic Design of a Tilt-Rotor Blade", Office National d'Etudes et de Recherches Aerospatiales (O.N.E. R.A), dated 1990, 9 pages.
International Search Report and Written Opinion for International Patent Application No. PCT/US2024/027449, dated Sep. 5, 2024, 12 pages.

* cited by examiner

400

400

| | | | |
|---|---|---|---|
| Dimensions | Wing Span | ft | 70 |
| | Wing Area | sq. ft | 440 |
| | Wing Aspect Ratio | | 11.14 |
| | Wing Airfoil Family | | IBmix6q OBinte001 |
| | Fuselage Length | ft | 68 |
| | Payload Bay Size | ft | 30x8x7 |
| | Cargo Ramp Size | ft | 10x8 |
| | Payload Bay Volume | cu. ft | 1,692 |
| | Bay Volume Incl Ramp | cu. ft | 2,097 |
| Weights | Empty | Lb | 21,000 |
| | Pilots | Lb | 400 |
| | Max Payload | Lb | 20,000 |
| | VTOL Weight - SL103 | Lb | 46,000 |
| | VTOL Weight - 4K95 | Lb | 40,000 |
| | Max VTOL Weight - SLS | Lb | 55,000* |
| Propulsion | Rotor Diameter | ft | 31.915 |
| | Number of Blades | | 4 |
| | Rotor Solidity | | 0.16 |
| | Rotor Airfoil Family | | rXX_V2 |
| | Hover tip speed | ft/s | 770 |
| | Rotor Drive Torque | ft Lb | 81,000 |
| | Drive Grear Shift Ratio | | 1.65 : 1 |
| | Number of Engines | | 4 |
| | Engine Type | | GE T901 (Tilting) |
| | Engine MRP SLS | hp | 3,344 |
| Performance - @SL103VTOL Weight | Speed V$_{MCP}$, 15,000' STD | KTAS | 450 |
| | Speed V$_{MCP}$, 30,000' STD | KTAS | 420 |
| | Speed V$_{MCP}$, SL95 | KTAS | 428 |
| | Limit Cruise Mach | | 0.72 |
| | Cruise Ceiling | ft | 36,000 |
| | OEI Hover Landing - SLS | Lb | 45,000 |
| | Aerial Refueling | | Yes |
| | Nap of Earth Maneuver | | Yes |
| | Endurance - 15,000' | hrs | 11.5 |
| | With Payload | Lb | 12,000 |
| | Flight Radius | nm | 1,800 |
| | With Payload | Lb | 12,000 |
| | Rate of Climb @ 15,000' | ft/min | 4,800 |
| | Rate of Climb @ 22,000' | ft/min | 3,000 |
| | Sustained Maneuver | g | 2.8 |

*Likely STOL operation due to 31 psf disc loading

Pressure Coefficient (CFD analysis of high speed)

35%

30%

Bm1

25%    SLS

4K95

Damping (% crit)

20%

15%    Bm2

10%

5%    Bm3
Bm4
Bm5
Bm6

0%
0    0.02  0.04  0.06  0.08  0.10  0.12  0.14  0.16  0.18

CT/σ

(CAMRAD hover stability)

AIRCRAFT WITH TRANSONIC ROTOR

PRIORITY CLAIM

This application claims priority to U.S. provisional application Ser. No. 63/464,292 filed on May 5, 2023. This and all other referenced extrinsic materials are incorporated herein by reference in their entirety. Where a definition or use of a term in a reference that is incorporated by reference is inconsistent or contrary to the definition of that term provided herein, the definition or use of that term provided herein is deemed to be controlling.

FIELD OF THE INVENTION

The field of the invention is high efficiency rotorcraft.

BACKGROUND

The following description includes information that may be useful in understanding the present invention. It is not an admission that any of the information provided herein is prior art or relevant to the presently claimed invention, or that any publication specifically or implicitly referenced is prior art.

A rotorcraft has two particularly important performance capabilities. One capability is cruise speed currently achieved with jet powered aircraft or with turboprop powered aircraft. The other is hover without forward speed to provide Vertical Take-Off and Landing (VTOL), typically achieved using rotary wing helicopters.

The design of aircraft to achieve both capabilities is very challenging, especially if both high hover efficiency (in terms such as of hover weight vs. required power) and efficient high-speed cruise (in terms such as payload carried to a range vs. fuel used) are required. Central to this challenge is the contrasting desire for low disc loading (large diameter) rotors for efficient, capable hover, while jet engines or high disc loading propellers typically allow efficient high-speed cruise. This trend is illustrated on FIG. 1, showing hover efficiency (power loading) vs. disc loading for various VTOL configurations. (Abstracted from NASA SP-2000-4517, "The History of the XV-15 Tilt Rotor Research Aircraft: From Concept to Flight").

To further illustrate the difference in disc loading, first consider helicopters which are typically designed to favor hover performance, with limited consideration for maximum speed. An example is the Robinson R22 which lifts its 1,370 Lb weight with 124 HP engine (11 Lb/HP) and a low 2.75 Lb/sq. ft. (psf) disc loading. Its edgewise speed is limited to 96 knots. The Bell/Boeing V-22 has a 47,500 Lb VTOL weight with 12,300 HP engines (3.86 Lb/HP) and a medium 20.8 psf disc loading. Overall, the V-22's design is biased toward hover as carrying payloads is the most critical parameter of the mission set. The rotor tip speed range of 662 to 820 ft/s and wing aerodynamic design (23% t/c airfoil) are consistent with its maximum dash speed of 275 knots (Mach 0.45). The more recent Bell V-280 is smaller than the V-22 and improves dash speed to 300 knots (Mach 0.50). These examples support the trend of larger rotors and therefore lower disc loading being preferred for VTOL aircraft.

This contrasts with higher cruise speed non-VTOL (wing-borne cruise) propeller driven aircraft which are powered by higher power/disc area propellers. Examples are: a) Lockheed C-130J using 32.4 HP/Ft^2 propellers to cruise at 348 knots, and b) Airbus A400M using 45 HP/Ft^2 propellers to cruise at 422 knots. The preference of higher HP/Ft^2 propellers for higher cruise speed is known in aeronautics. Transonic and supersonic fighter jets with VTOL capability such as the AV-8B Harrier II and F-35B use jet engines for hover and VTOL, and the latter lands vertically by adding a high disc loading fan.

Previous efforts have attempted to reconcile the rotor size challenge for high speed VTOL. Edgewise rotors which stow were proposed to the US Army and USAF by Lockheed with the CL-945 in the 1960s. Boeing proposed a folding tiltrotor in 1985, called the "Folding Tiltrotor Technology Demonstrator" and Tactical Tiltrotor, and extensive research was performed on rotor designs to achieve in-flight folding. Since 2021, Bell Textron Inc. has proposed folding tiltrotor concepts which typically leverage a to-be-developed "convertible" engine which can switch between turboshaft and turbofan modes.

Sikorsky in the 1990s developed its patented Variable Diameter Tilt Rotor through wind tunnel testing which avoids the combined dual propulsion by substantially reducing the rotor diameter (to 65%) from VTOL to wingborne cruise. This innovation demonstrates the conventional desire to use high disc loading propellers for high efficiency in high-speed cruise.

Another important aeronautical limitation which becomes consequential at higher speeds (so-called transonic speeds) is the Mach number at drag divergence. The speed of sound and therefore the aircraft Mach are a function of the air temperature. Low drag of an airfoil can only be achieved for limited combinations of airfoil thickness ratio, design lift coefficient, and Mach number. These trends are shown in FIG. 2, abstracted from Shevell (1989).

This limit of speed due to compressible drag divergence affects wing and rotor designs. Rotorcraft rotors are designed with a hover tip speed between 0.6 and 0.75 Mach to balance blade loading, noise, and structural requirements. Tiltrotor configurations are further constrained by the combined axial and rotational speeds during cruise with the proprotor acting as a propeller. Current tiltrotor aircraft (V-22, V-280, and the Agusta-Westland AW609) have dash speeds of 275-300 knots, all below Mach 0.5. The V-22 hover tip speed is Mach 0.75. It reduces the rotor RPM to 80% in cruise to maintain a combined tip speed of Mach 0.75.

A challenge especially impactful to tiltrotor configurations is avoiding whirl flutter at the desired airspeeds. The whirl flutter mode is an aeroelastic instability involving the coupling of proprotor forces and flexible structure, namely the nacelle and wing. To avoid whirl flutter, the tiltrotor wing and nacelle must have sufficient stiffness to avoid excitation by the proprotor. High wing thickness (t/c) is preferred for weight efficiency. The V-22 wing, for example, uses an exceptionally thick 23% t/c wing airfoil. Higher airspeeds would require even higher wing stiffness, but this is at odds with the limits of airfoil thickness at higher Mach shown in FIG. 2.

In view of the above, it was previously thought any tilt rotor aircraft flying at or above Mach 0.65 must use either a variable diameter rotor or a folding rotor. However, both of those choices are problematic due to increased complexity and potential inflight failure risk.

All current and previously flown tiltrotor aircraft were limited to 300 knots (Mach 0.5) or lower, had articulated rotors and had very thick wings which provide the high stiffness required to avoid whirl flutter (aeroelastic instability involving the coupling of proprotor forces and flexible structure, namely the nacelle and wing) at that speed, and all had unswept rotor blades. This absence of sweep in blades of tiltrotor aircraft is consistent with the expectations of a PHOSITA, because swept blades provide less lift for a given blade weight, which is undesirable in VTOL maneuvers, and offers no benefit in forward flight at Mach 0.5 or lower.

A University of Maryland study titled "Development and Whirl Flutter Testing of Swept-Tip Tiltrotor Blades" used a small-scale wind tunnel model to investigate the effect of sweepback of the outer 20% of a tilt rotor blade (typical of helicopter blade tip sweep) on whirl flutter. However, there are not even any suggestions in the prior art for a tiltrotor aircraft to have blade sweep of at least 50% of the length of the blade.

Accordingly, there is still a need for a tilt rotor aircraft that can operate at Mach number above 0.65 without varying the rotor diameter and without using a folding rotor.

SUMMARY OF THE INVENTION

In stark contrast to the experience and expectations of those having ordinary skill in the art, it has now been discovered that it is possible to design a tiltrotor aircraft that can operate at Mach number of 0.65-0.7, without resorting to either rotors with variable rotor diameter or folding rotors. This is accomplished by designing the aircraft with large, thin, aggressively double swept rotors.

In preferred embodiments a tiltrotor aircraft had first and second large proprotors, with blades in which the leading edge is swept both forward and aft, with the swept portion occupying at least 50% of the length of the blade, and the aft swept portion occupying at least 30% of the length of the blade. In especially preferred embodiments, the aft sweep is at least 30 degrees, with the thickness at the inboard portion of the blade less than 16%.

High efficiency is accomplished in part by using a drive system configured to rotate each of the first and second proprotors at a rotation speed (RPM) in forward flight less than 70% of a maximum RPM in hover flight.

The first and second proprotors are sized to collectively provide at least 80% of the lift required for hover. In other contemplated embodiments, first and second proprotors are sized to collectively provide at least 95% or even 100% of the lift required for hover. Viewed from another perspective, each of the first and second proprotors is configured to have a disc loading of at most 40 psf, and in other embodiments from 40 to 100 psf.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 6 is a table showing properties of a proposed aircraft.

DETAILED DESCRIPTION

Figure 1:
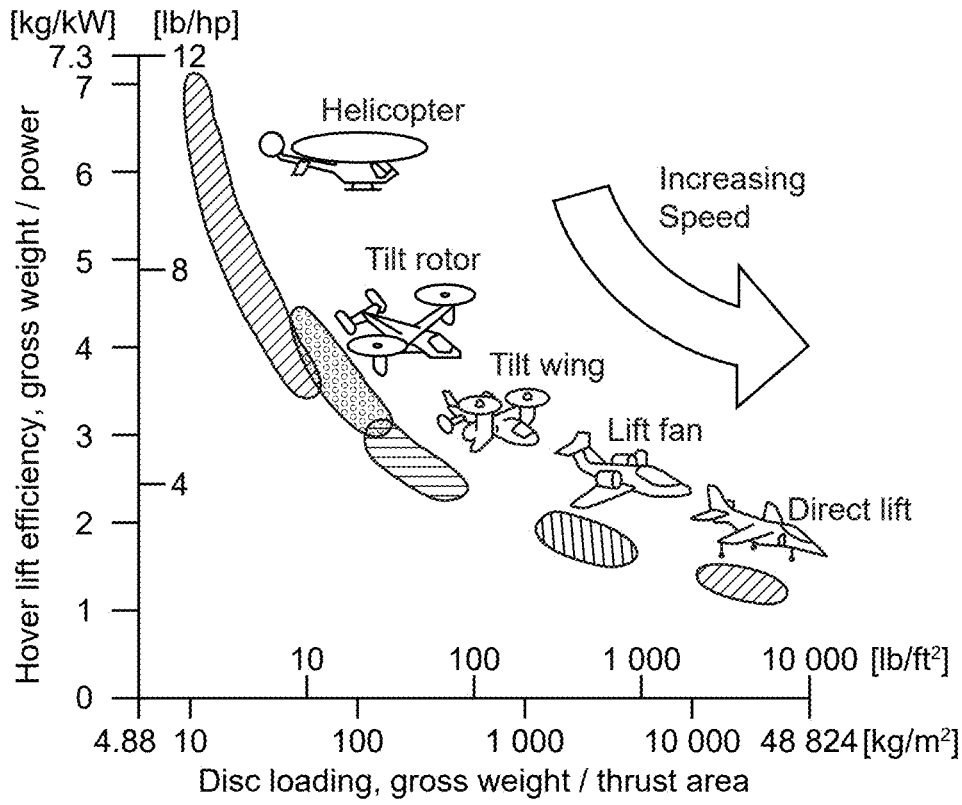
FIG. 1 is a graph showing hover efficiency (power loading) vs. disc loading for various VTOL configurations.

FIG. 1 is a graph showing hover efficiency (power loading) vs. disc loading for various VTOL configurations.

Figure 2:
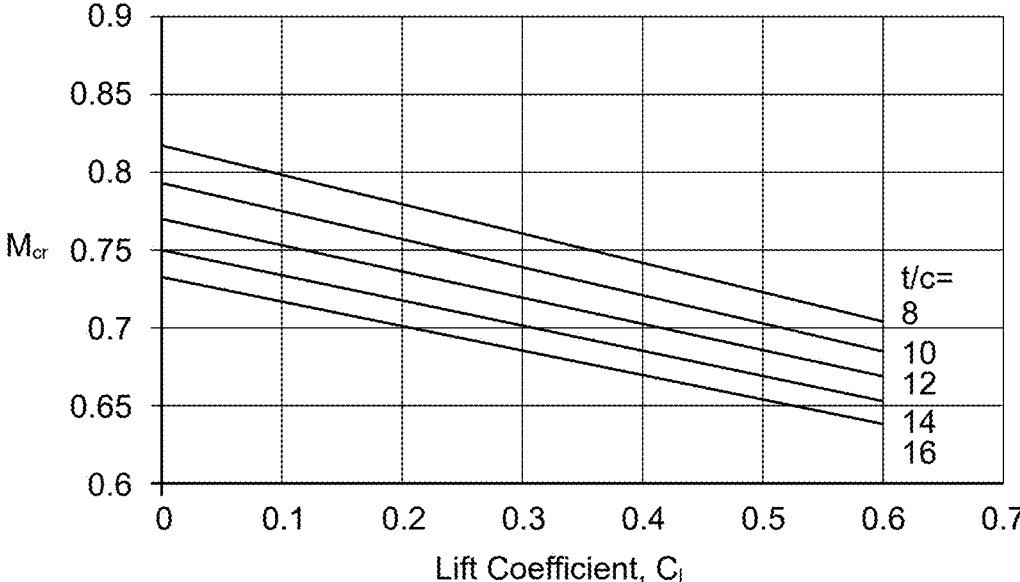
FIG. 2 is a graph showing Mach number versus design lift coefficient.

FIG. 2 is a graph showing Mach number versus design lift coefficient.

Figure 3A:
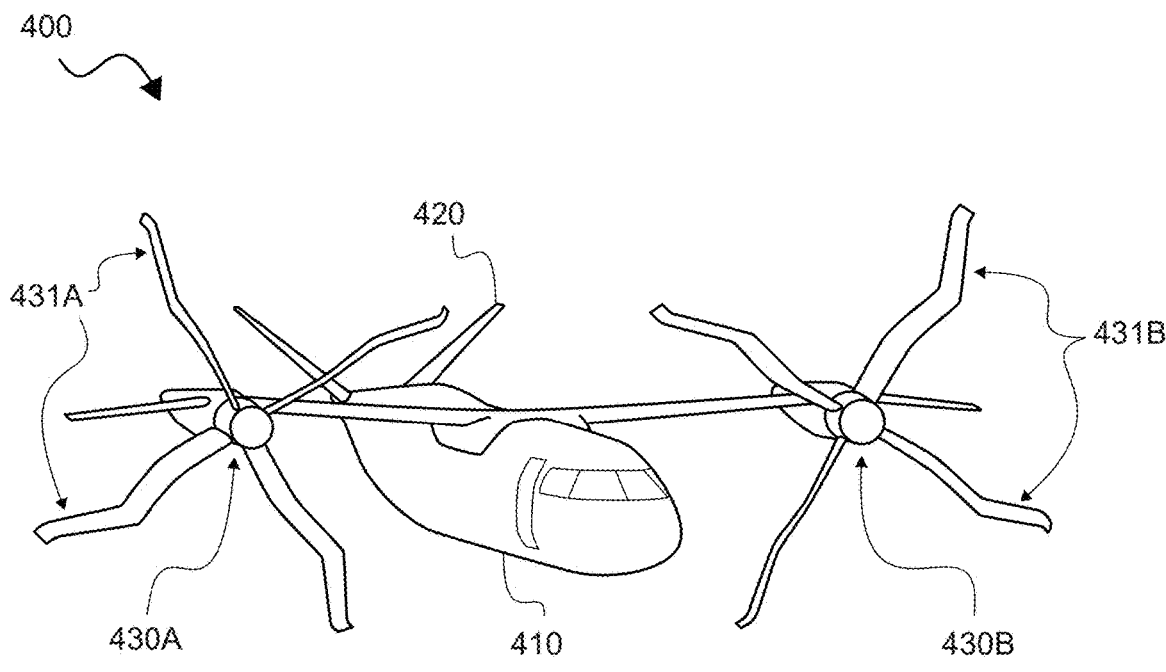
FIGS. 3A and 3B are perspective view a tiltrotor aircraft having a fuselage, a tail section, and two 4-blade transonic proprotors.
Figure 3B:
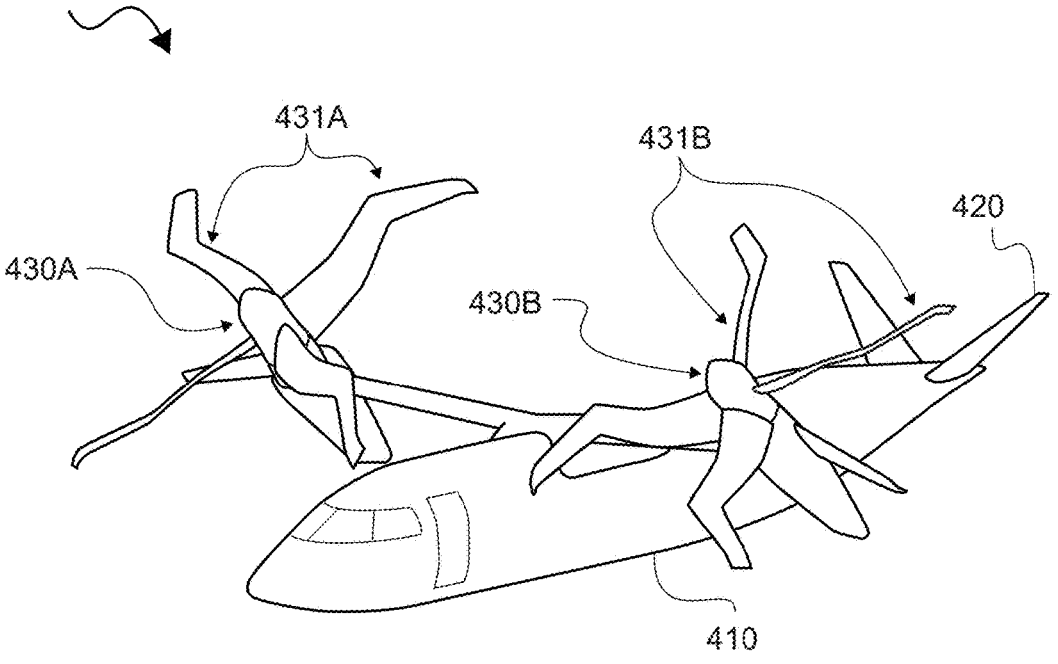

FIGS. 3A and 3B depict a tiltrotor aircraft 400 having a fuselage 410, a tail section 420, and two 4-blade transonic proprotors 430A, 430B. The aircraft 410 is designed to provide a maximum cruise at Mach 0.7 and to operate across a wide RPM range for efficient thrust in both wing-borne and rotor-borne flight.

The rotors are stiff, hingeless rotors in accordance with the Optimum Speed Tiltrotor (OSTR) technology first disclosed in U.S. Pat. No. 6,641,365 to Karem. Unlike the articulated rotors of existing tiltrotors and most helicopters, stiff, hingeless rotors are uniquely capable of operating across a wide RPM range. At high speed cruise the RPM is preferably reduced to approximately 60% of the hover RPM. This results in a combined tip speed of Mach 0.8 to 0.9 at the maximum airspeed across the altitude range. The rigid rotors contemplated here are also advantageous because they transfer all of the blade root moments to the nonrotating frame through the hub.

The rotor blades 431A, 431B incorporate high sweep angles and supercritical airfoils. Supercritical airfoils delay the onset of compressible drag by positioning the peak pressure and consequent shock further aft on the upper surface. This pressure distribution typically results in higher aft loading and therefore pitching moment. High sweep and supercritical airfoils are unavailable to conventional rotors because they lack the stiffness to react the resulting feather moment. Stiff, hingeless rotors can fully leverage the benefits of these modifications. In contemplated embodiments, the required stiffness relative to blade weight is accomplished using the stiff, hingeless rotors in accordance with the Optimum Speed Tiltrotor (OSTR) technology first disclosed in U.S. Pat. No. 6,641,365 to Karem.

Figure 4:
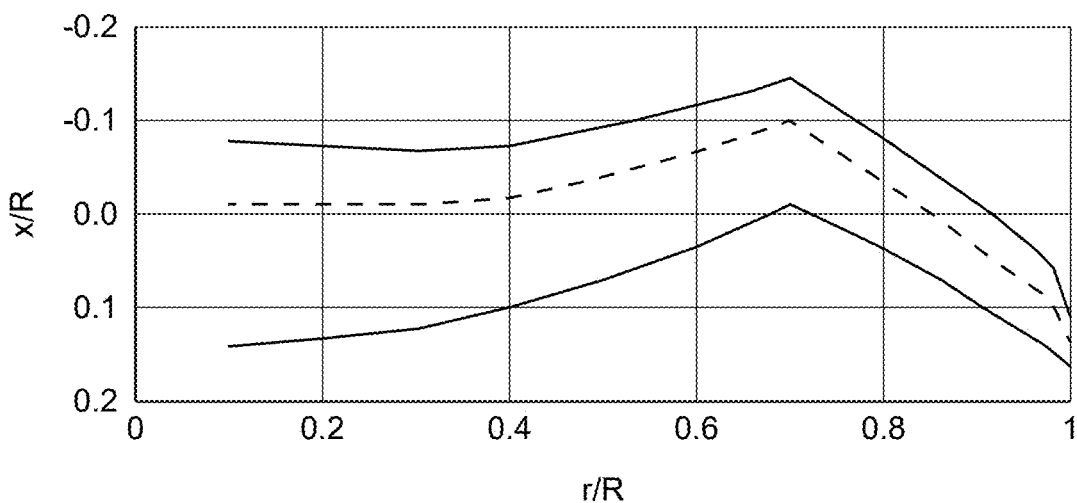
FIG. 4 is a graph depicting a preferred rotor blade planform of rotor blades.

FIG. 4 is a graph depicting a preferred rotor blade planform of rotor blades 431A, 431B.

Figure 5:
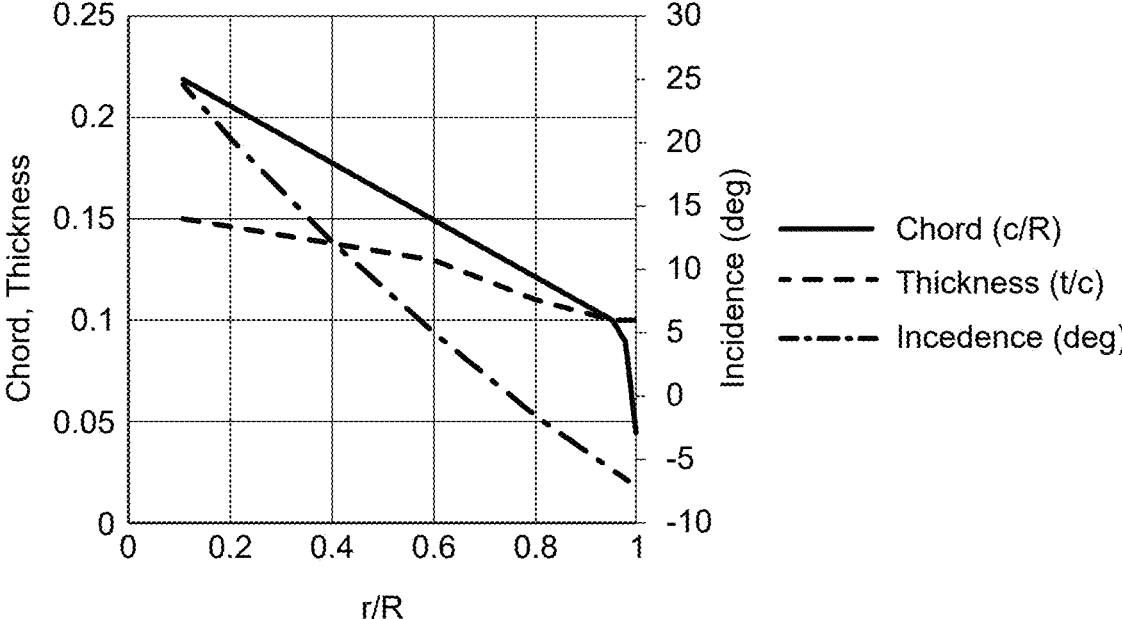
FIG. 5 is a graph depicting the corresponding spanwise distributions of chord length, airfoil thickness ratio, and incidence.

FIG. 5 is a graph depicting the corresponding spanwise distributions of chord length, airfoil thickness ratio, and incidence.

Each of the rotor blades 431A, 431B has a significant linear taper of 50%. to 58%, more preferably 52% to 56%, and most preferably 54%, from 10% to 94% span.

In each of the rotor blades 431A, 431B the chord is further reduced by 49% to 57%, more preferably 51% to 55%, and most preferably 53%, from 94% span to the tip.

The airfoil thickness ratio of each of the rotor blades 431A, 431B is reduced from 15%-chord at the root to 13%-chord at 60% span and 10%-chord at the tip.

Each of the rotor blades 431A, 431B has a total twist of between 28° and 36°, more preferably between 30° and 32°, and most preferably −32° from root to tip.

Each of the rotor blades 431A, 431B is preferably constructed of medium-modulus carbon fibers (e.g. Toray™ T1100G). The spar is defined by upper and lower surface skins connected by two shear webs, with the area enclosed by the skins and webs substantially hollow. The distribution of fiber orientations preferably changes over the span, with more 0° fibers at the blade root to provide high lead-lag stiffness necessary for operation across a wide range of RPMs in hover and forward flight. More ±45° fibers at the outboard stations of the blade are used to reduce the coupling of the flap and torsional degrees of freedom of the forward/aft swept portions of the blade.

The blade leading edge can have the same laminate as the skin of the spar. This provides a robust and damage-tolerant structure for operation at high speeds while also providing additional torsional stiffness to the blade. Blade skin thickness can advantageously taper from root to the tip.

The sweep is designed to keep the effective Mach number seen at a local airfoil across the rotor blade below 0.72 for all flight conditions. The sweep allows for the use of thicker airfoils that are critical for the rotor design. The forward to aft sweep planform design is set to minimize feather moments by balancing the offset lift center of inboard and outboard sections.

FIG. 6 is a table showing properties of a proposed aircraft.

Figures 7A, 7B:
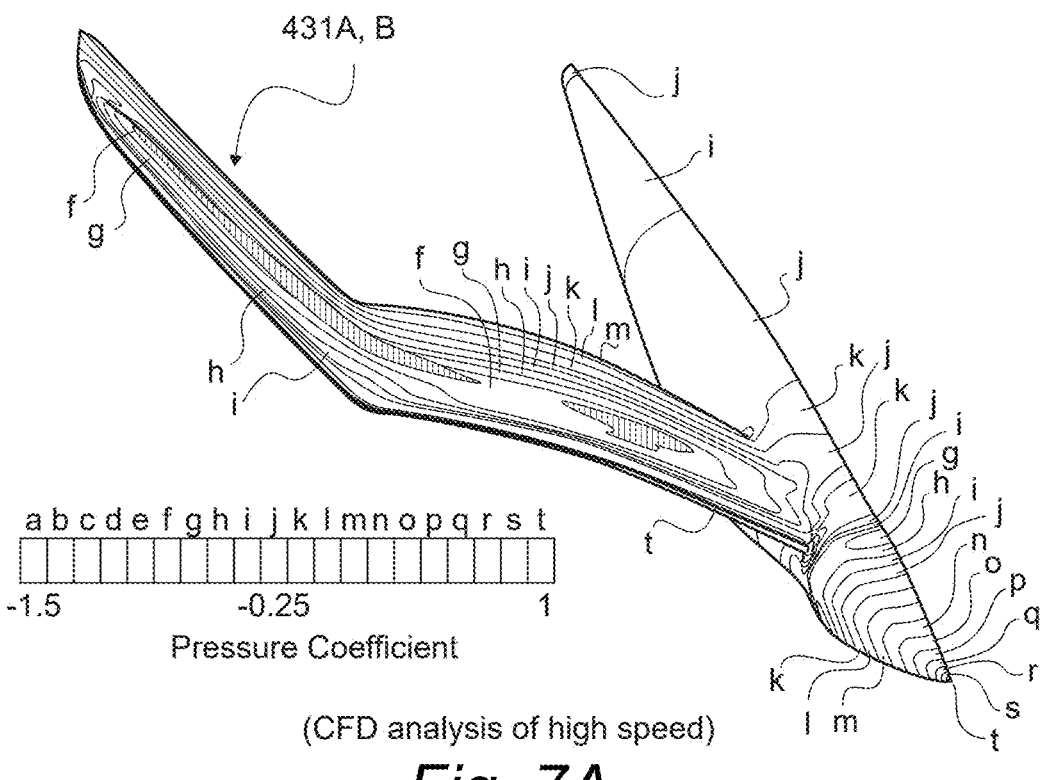
FIG. 7A and FIG. 7B depict details of the aircraft of FIGS. 4A and 4B.

FIGS. 7A and FIG. 7B depict details of the aircraft of FIGS. 4A and 4B. The rotor blade design was analyzed using CHARM and CFD++ for loads, aerodynamic performance as depicted in FIG. 7A and was analyzed using CAMRAD to prove dynamic stability as depicted in FIG. 7. The analysis shows the rotor design of the aircraft of FIGS. 4A and 4B capable of satisfying maximum cruise at Mach 0.7

Figure 8:
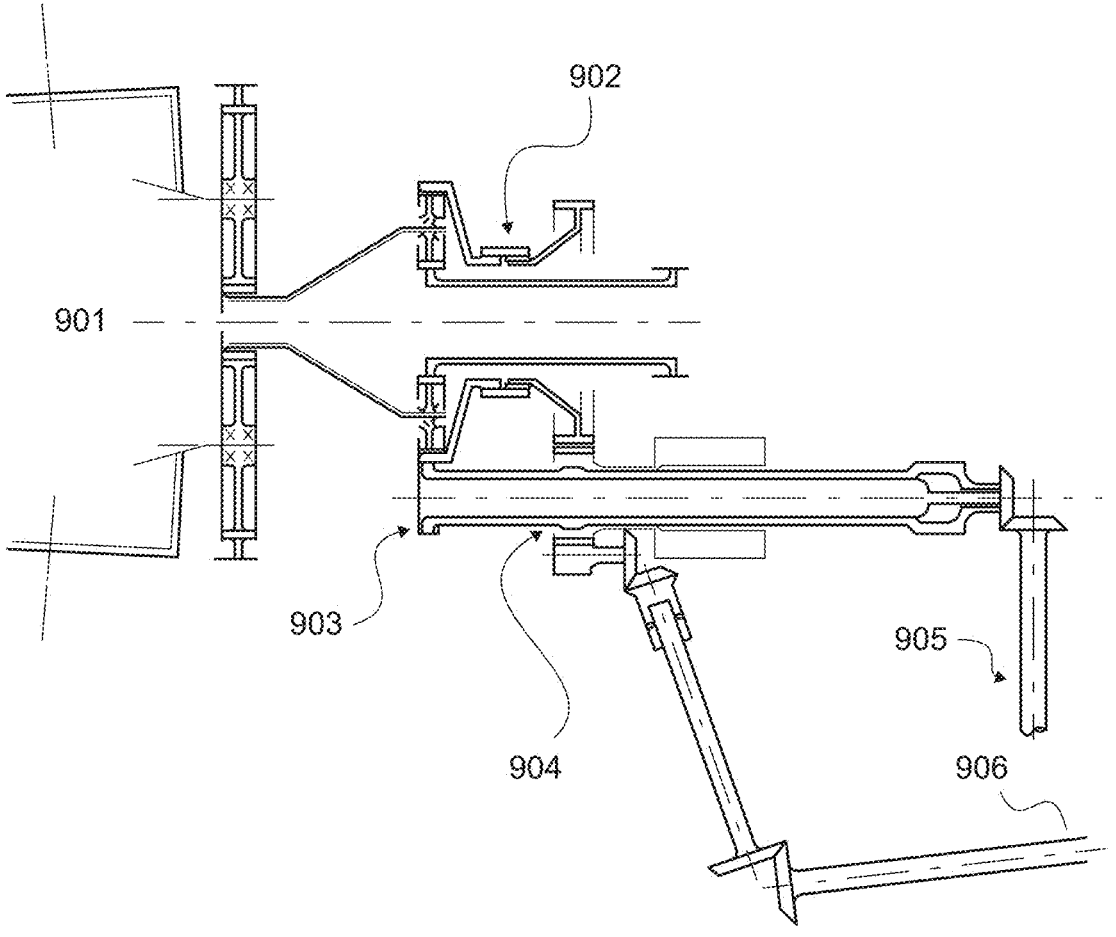
FIG. 8 is a schematic of a drive system of the aircraft of FIGS. 4A and 4B configured to rotate each of the first and second proprotors at a rotation speed (RPM) in forward flight less than 70% of a maximum RPM in hover flight.

FIG. 8 is a schematic of a drive system 900 with variable RPM, of the aircraft 400 configured to rotate each of the first and second proprotors 431A, 431B, respectively, at a rotation speed (RPM) in forward flight less than 70% of a maximum RPM in hover flight.

As seen in FIG. 8, drive system 900 includes a rotor hub 901, a gear shift spline engagement 902, a propeller mode drive 903, a HELO mode drive with overrunning sprag 904, a cross shaft to the other nacelle 905 and an engine input 906 (of which there are two per nacelle).

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for operating a tilt rotor aircraft having first proprotor has a blade with an inboard portion and a swept outboard portion, in which:

the swept portion occupies at least 50% of a length of the blade; and a leading edge of the blade is swept both forward and aft;

the blade is constructed of a medium-modulus carbon fiber whereby a distribution of fiber orientations changes from 0 degree fibers at a blade root and 45 degree fibers at an outboard station of the blade;

and operating the aircraft with a tip speed of the rotor between Mach 0.8-0.9 via a drive system with variable RPM coupled to the first proprotor.

2. The method of claim 1, wherein the aft swept portion is at least 30% of the length of the blade, and has an aft sweep of at least 30 degrees.

3. The method of claim 2, wherein the inboard portion has a thickness-to-chord ratio of less than 16%.

4. The method of claim 1, further comprising providing, by the first proprotor, at least 80% of a lift required for hover.

5. The method of claim 1, further comprising providing, by the first proprotor, at least 95% of a lift required for hover.

6. The method of claim 1, where each of the first proprotor is sized relative to a maximum rated capacity of the aircraft to have a disc loading of up to 40 psf.

7. The method of claim 1, where each of the first proprotor is sized relative to a maximum rated capacity of the aircraft to have a disc loading of 40-100 psf.

8. The method of claim 1, wherein each of the first and second proprotors is a hingeless rotor.

9. The method of claim 1, wherein the blade has a linear taper of 50% to 58% from 10% to 94% span.

10. The method of claim 1, wherein a chord of the blade further reduced by 49% to 55% from 94% span to a tip.

11. The method of claim 1, wherein an airfoil thickness ratio of the blade is reduced from 15%-chord at a root to 13%-chord at 60% span and 10%-chord at a tip.

12. The method of claim 1, wherein the blade has a total twist of −32 degrees from root to tip.

13. The method of claim 1, further comprising rotating, by a drive system, each of the first and second proprotors at a rotation speed (RPM) in forward flight less than 70% of a maximum RPM in hover flight.

* * * * *